US007367305B2

(12) United States Patent
Endoh et al.

(10) Patent No.: US 7,367,305 B2

(45) **Date of Patent: *May 6, 2008**

(54) INTERNAL COMBUSTION ENGINE AND CONNECTING ROD THEREFOR

(75) Inventors: Tsuneo Endoh, Wako (JP); Kengo Ishimitsu, Wako (JP); Tsutomu Inoue, Wako (JP); Takao Tsuboi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,785

(22) Filed: Nov. 4, 2004

(65) Prior Publication Data

US 2005/0098140 A1 May 12, 2005

(30) Foreign Application Priority Data

Nov. 7, 2003 (JP) ............................ 2003-378050
May 24, 2004 (JP) ............................ 2004-153388

(51) Int. Cl.
*F02F 3/00* (2006.01)

(52) U.S. Cl. ................................ 123/197.3; 123/197.6

(58) Field of Classification Search ............ 123/197.2, 123/197.1, 193.6, 197.4, 197.3; 92/187
See application file for complete search history.

(56) References Cited

U.S. PATENT DOCUMENTS 1,612,047 A * 12/1926 Owens ........................ 92/140
2,046,903 A 7/1936 List
3,069,210 A * 12/1962 Rogers et al. ................ 92/187
4,073,220 A * 2/1978 Guenther ..................... 92/190
4,253,430 A * 3/1981 Garter et al. ............ 123/41.38
4,270,494 A * 6/1981 Garter et al. ............ 123/41.35
4,662,319 A * 5/1987 Ayoul ...................... 123/41.35
4,836,045 A * 6/1989 Lobig ....................... 74/579 E
4,858,566 A * 8/1989 Paul et al. ............... 123/41.35
5,094,195 A * 3/1992 Gonzalez ................... 123/56.4
5,121,722 A * 6/1992 Horiuchi ..................... 123/276
5,313,875 A * 5/1994 Kadlicko ..................... 92/157
5,413,074 A * 5/1995 Horiuchi .................. 123/197.2
6,223,703 B1 * 5/2001 Galvin ..................... 123/48 B
6,408,813 B1 * 6/2002 Wilksch et al. .......... 123/197.3
6,505,598 B1 * 1/2003 Donais .................... 123/197.4
6,752,120 B2 * 6/2004 Saito et al. ............. 123/197.4
2004/0154578 A1 * 8/2004 Weaver ................... 123/197.3

(Continued)

FOREIGN PATENT DOCUMENTS

FR 563 390 12/1923

(Continued)

*Primary Examiner*—Tony M. Argenbright
*Assistant Examiner*—Jason Benton
(74) *Attorney, Agent, or Firm*—Birch, Stewart, Kolasch & Birch, LLP

(57) ABSTRACT

A connecting rod of an internal combustion engine, and an internal combustion engine including the connecting rod, a piston, a crankshaft and a float bearing as main moving parts. A piston is connected to a connecting rod by a spherical joint and has radial ribs on a rear face of a crown part; a connecting rod is of an integrated, one-piece type having integrally a spherical small end part to be connected to the piston and an annular big end part; the crankshaft is of an assembly type, and a float bearing is interposed between the big end part and a crank pin.

10 Claims, 11 Drawing Sheets

U.S. PATENT DOCUMENTS

| | | | | |
|---|---|---|---|---|
| 2005/0092280 | A1* | 5/2005 | Endoh et al. | 123/193.6 |
| 2005/0098141 | A1* | 5/2005 | Endoh et al. | 123/197.3 |
| 2005/0235946 | A1* | 10/2005 | Doers et al. | 123/197.4 |
| 2006/0283287 | A1* | 12/2006 | Pankl | 74/579 E |

FOREIGN PATENT DOCUMENTS

| | | | |
|---|---|---|---|
| JP | 1218189 | Y | 12/1937 |
| JP | 62-3887 | A | 1/1987 |
| JP | 63-65180 | A | 3/1988 |
| JP | 6-117428 | A | 4/1994 |
| JP | 6-58230 | U | 8/1994 |
| JP | 6-280847 | A | 10/1994 |
| JP | 9-144879 | A | 6/1997 |
| JP | 2003-120534 | A | 4/2003 |

* cited by examiner 10
33
34
36
37
13
14
21
11
22
71
66
68
12
23
41
16
17
31
41
18
25
38
32
44
44
42

(EMBODIMENT)

(COMPARATIVE EXAMPLE)

INTERNAL COMBUSTION ENGINE AND CONNECTING ROD THEREFOR

FIELD OF THE INVENTION

This invention relates to an internal combustion engine including a piston, a connecting rod, a crankshaft and a float bearing as main moving parts, and to the detail of a connecting rod for an internal combustion engine.

BACKGROUND OF THE INVENTION

An internal combustion engine of related art in which a connecting rod with an integral big end part is connected to an assembly-type crankshaft appears for example in JP-A-6-280847.

A connecting rod for an internal combustion engine of related art that is connected to a piston by a spherical joint appears for example in JP-A-9-144879. The content of JP-A-9-144879 will be explained with reference to FIG. 12.

A crankshaft shown in JP-A-6-280847 is an assembled member made up of a first section, a second section, a third section and a fourth section; a recess is provided in each of a first crank web mounted on the first section and a second crank web mounted on the second section, and a pin is rotatably fitted in bearings in these recesses.

The connecting rod has an integral big end, a hole is provided in the big end, and a pin is rotatably fitted in this hole.

When the crankshaft is made an assembly type like this, unnecessary metal can be removed to reduce its weight, and by the connecting rod being made of integral big end type, compared to a connecting rod with a two-piece big end, bolts can be dispensed with and weight can be reduced.

When the above-mentioned bearings between the recesses and the pin are needle bearings, the big end of the connecting rod becomes large, the weight of the connecting rod becomes large, and consequently the above-mentioned weight-reducing effects of the assembly type crankshaft and the integral big end type connecting rod are reduced.

Thus, to reduce the weight of an internal combustion engine, for example to raise the speed, the output and the durability of the internal combustion engine, it is important to reduce the weights of the main moving parts, and if weight-reduction of the main moving parts is not carried out comprehensively, a large, synergetic effect cannot be obtained. By the combination of main moving parts, not only reduced weight but also other effects such as strength and ease-of-assembly benefits can be expected.

The connecting rod 200 shown in FIG. 12 is a member having a convex spherical surface 202 formed on a small end part 201, and this convex spherical surface 202 fits slidably against a concave spherical surface 204 provided on the piston 203 side. That is, the connecting rod 200 and the piston 203 are connected by a spherical joint 205 formed by the convex spherical surface 202 and the concave spherical surface 204.

The crankshaft 200 described above swings along with the reciprocal motion of the piston 203 and rotates a crankshaft (not shown).

Accordingly, if the weight of the main moving parts such as the crankshaft 200, the piston 203 and the crankshaft (the parts that transmit power in the internal combustion engine) can be reduced, their respective inertias decrease, the loads on the areas supporting these parts can be reduced, and higher output can be obtained through higher internal combustion engine speeds.

Thus, in the internal combustion engine, means have been awaited for achieving higher speeds, higher power and better durability through weight-reduction of the connecting rod itself and comprehensive weight-reduction of the other main moving parts and for increasing for example strength and ease-of-assembly through the effective combination of main moving parts.

SUMMARY OF THE INVENTION

The present invention provides an internal combustion engine including as main moving parts a piston and a connecting rod connected to this piston, wherein: the piston has a piston-side joint part provided on a rear side of a crown part to form a spherical joint and multiple radial ribs extending from this piston-side joint part to a circumferential wall formed cylindrically at the edge of the crown part, and the connecting rod has a spherical small end part for forming the spherical joint together with the piston-side joint part.

In this internal combustion engine, by the piston-side joint part of the piston and the spherical small end part of the connecting rod forming a spherical joint, compared to a construction wherein a pair of pin bosses is provided on the piston and the small end of the connecting rod is connected to these pin bosses by a piston pin as in related art, in this invention, the piston pin becomes unnecessary, and if a construction is adopted wherein a concave spherical surface is formed on the piston-side joint part of the piston and a spherical small end part of the connecting rod is fitted in this concave spherical surface, the shapes of the piston and the connecting rod become simple and the piston itself and the respective connecting parts of the piston and the connecting rod can be made light.

By the piston being provided with radial ribs, when combustion pressure or inertial forces act on the piston, stress arising in the crown part and the piston-side joint part can be distributed by the radial ribs, and for example compared to preventing stress concentrations by making the thickness of the crown part large, in this invention, as a result of the radial ribs being formed, the thickness of the crown part can be made small, and the piston can be made lighter.

Also, by the combination of the spherical joint and the radial ribs, the shape of the underside of the piston crown part can be made a more uniform shape, the distribution of stress arising in the crown part can be made almost even, and the maximum stress can be reduced; consequently, it becomes possible to produce a synergistic effect greater than that of simply adding the effect of the spherical joint alone to the effect of the radial ribs alone.

The invention also provides an internal combustion engine including as main moving parts a connecting rod, a crankshaft having a crank pin for connecting it to an annular big end part of the connecting rod, and a float bearing interposed between the big end part and the crank pin, wherein the connecting rod is of an integral type having the annular big end part integral therewith; the crankshaft is of an assembly type made up of multiple component parts; the radius r2 of the crank pin is a large diameter greater than or equal to the distance L between the axis 141 of the crankshaft 18 and the axis 142 of the crank pin 17, and the crank pin 17 is hollow; and an inner circumferential space for forming an inner circumferential oil film 127 is provided between the float bearing 31 and the crank pin 17 and an outer circumferential space for forming an outer circumferential oil film is provided between the float bearing and the big end part.

In the internal combustion engine described above, by means of the integral big end type connecting rod, for example compared to a two-part big end assembled by joining a rod part and a connecting rod cap together with nuts and bolts, in this invention, the construction can be made simple and the number of parts reduced, and the connecting rod can be made light while also being made easy to manufacture.

By the crankshaft being made an assembly type, it is easy for hollows to be formed inside it, and furthermore the crankshaft can be made light. In particular, by the crank pin being made hollow, weight and inertial moment can be reduced, and higher speed and output of the internal combustion engine can be achieved.

And, by the crank pin being made large in diameter, the crankshaft can be made highly rigid, the resonant frequency of the crankshaft can be raised, and the crankshaft speed and the durability of the crankshaft can be increased.

Also, by means of the combination of the crank pin of the assembly-type crankshaft, the connecting rod with the integral big end, and the float bearing interposed between these, it is possible to make the bearing structure small, and weight can be reduced and the ease of assembly of the connecting rod to the crankshaft can be improved. And, by means of the float bearing, even if the crank pin is large-diameter, frictional loss between the crank pin and the float bearing and between the float bearing and the big end part can be reduced, and increases in the durability and the speed of the internal combustion engine can be achieved, and consequently it becomes possible to produce a synergistic effect greater than that of simply adding together the effect of the assembly-type crankshaft alone, the effect of the integral big end type connecting rod alone, and the effect of the float bearing alone.

The invention also provides an internal combustion engine including as main moving parts a piston, a connecting rod connected to this piston, a crankshaft having a crank pin for connecting it to an annular big end part of the connecting rod, and a float bearing interposed between the big end part and the crank pin, wherein: the piston comprises a piston-side joint part provided on a rear side of a crown part for forming a spherical joint and multiple radial ribs extending from this piston-side joint part to a circumferential wall formed cylindrically at the edge of the crown part; the connecting rod is of an integral type integrally having the annular big end part and a spherical small end part for forming the spherical joint together with the piston-side joint part; the crankshaft is of an assembly type made up of multiple component parts, the diameter of the crank pin is a large diameter greater than or equal to the distance between the axis of the crankshaft and the axis of the crank pin, and the crank pin is hollow; and an inner circumferential space for forming an inner circumferential oil film is provided between the float bearing and the crank pin and an outer circumferential space for forming an outer circumferential oil film is provided between the float bearing and the big end part.

In this internal combustion engine, by a spherical joint being formed by a piston-side joint part of the piston and a spherical small end part of the connecting rod, compared to a construction wherein a pair of pin bosses is provided on the piston and the small end of the connecting rod is connected to these pin bosses by a piston pin as in related art, in this invention, the piston pin becomes unnecessary, and if a construction is adopted wherein a concave spherical surface is formed on the piston-side joint part of the piston and a spherical small end part of the connecting rod is fitted against this concave spherical surface, the shapes of the piston and the connecting rod become simple and the piston itself and the respective connecting parts of the piston and the connecting rod can be made light.

By the piston being provided with radial ribs, when combustion pressure or inertial forces act on the piston, stress arising in the crown part and the piston-side joint part can be distributed by the radial ribs, and for example compared to preventing stress concentrations by making the thickness of the crown part large, in this invention, as a result of the radial ribs being formed, the thickness of the crown part can be made small, and the piston can be made lighter.

Also, by the combination of the spherical joint and the radial ribs, the shape of the underside of the piston crown part can be made a point-symmetric shape, and it can be made a more uniform shape, the distribution of stress arising in the crown part can be made almost even, and the maximum stress can be reduced; consequently, it becomes possible to produce a synergistic effect greater than that of simply adding the effect of the spherical joint alone to the effect of the radial ribs alone.

Also, by means of the integral big end type connecting rod, for example compared to a two-part big end assembled by joining a rod part and a connecting rod cap together with nuts and bolts, in this invention, the construction can be made simple and the number of parts reduced, and the connecting rod can be made light while also being made easy to manufacture.

By the crankshaft being made an assembly type, it is easy for hollows to be formed inside it, and furthermore the crankshaft can be made light. In particular, by the crank pin being made hollow, inertial moment can be reduced, and higher speed and higher output of the internal combustion engine can be achieved.

By the crank pin being made large in diameter, the crankshaft can be made highly rigid, the resonant frequency of the crankshaft can be raised, and the crankshaft speed and the durability of the crankshaft can be increased.

Also, by means of the combination of the crank pin of the assembly-type crankshaft, the connecting rod with the integral big end, and the float bearing interposed between these, it is possible to make the bearing structure small, and weight can be reduced and the ease of assembly of the connecting rod to the crankshaft can be improved. By means of the float bearing, even if the crank pin is large-diameter, frictional loss between the crank pin and the float bearing and between the float bearing and the big end part can be reduced, and increases in the durability and the speed of the internal combustion engine can be achieved, and consequently it becomes possible to produce a synergistic effect greater than that of simply adding together the effect of the assembly-type crankshaft alone, the effect of the integral big end type connecting rod alone, and the effect of the float bearing alone.

The invention also provides a connecting rod for an internal combustion engine, made up of a small end part to be connected to a piston, a big end part to be connected to a crank pin of a crankshaft, and a rod part connecting together the small end part and the big end part, wherein the small end part, the big and part and the rod part are connected together integrally, the small end part has a spherical surface constituting part of a spherical joint for connecting it to the piston, and the big end part is an integral annular part for fitting onto a disassemblable crank pin of an assembly-type crankshaft.

In the connecting rod for an internal combustion engine described above, because the whole connecting rod is connected integrally, for example compared to a two-part big end assembled by joining a rod part and a connecting rod cap together with nuts and bolts, in this invention, the construction can be made simple and the number of parts reduced, and the connecting rod can be made light.

Because the small end part has a spherical surface constituting part of a spherical joint for connecting it to the piston, a piston pin of the kind in related art becomes unnecessary, and if a spherical surface on the piston side and also a holding member for holding the small end part and a fastening member for fastening this holding member to the piston are provided, the piston itself and the respective connecting parts of the piston and the connecting rod can be made light.

Also, because the big end part is made an integrated annular part that fits on a disassemblable crank pin of an assembly-type crankshaft, it is easy to form a hollow part inside the disassembled crank pin, and it becomes easy to make the crankshaft light. Accordingly, the inertia moment of the crankshaft can be made small, the speed of the internal combustion engine can be increased, and the internal combustion engine can be made high-output.

In this invention, preferably, the rod part and the big end part are provided with hollow parts. With this connecting rod for an internal combustion engine, because hollow parts are provided in the rod part and the big end part, the connecting rod can be made light, and in combination with making the assembly-type crankshaft light it is possible to reduce the overall weight of the main moving parts of an internal combustion engine and it is possible to achieve higher speed of the internal combustion engine.

BRIEF DESCRIPTION OF THE DRAWINGS

Certain preferred embodiments of the present invention will be described below, by way of example only, with reference to the accompanying drawings, in which.

DETAILED DESCRIPTION OF THE PREFERRED EMBODIMENTS

Figure 1:
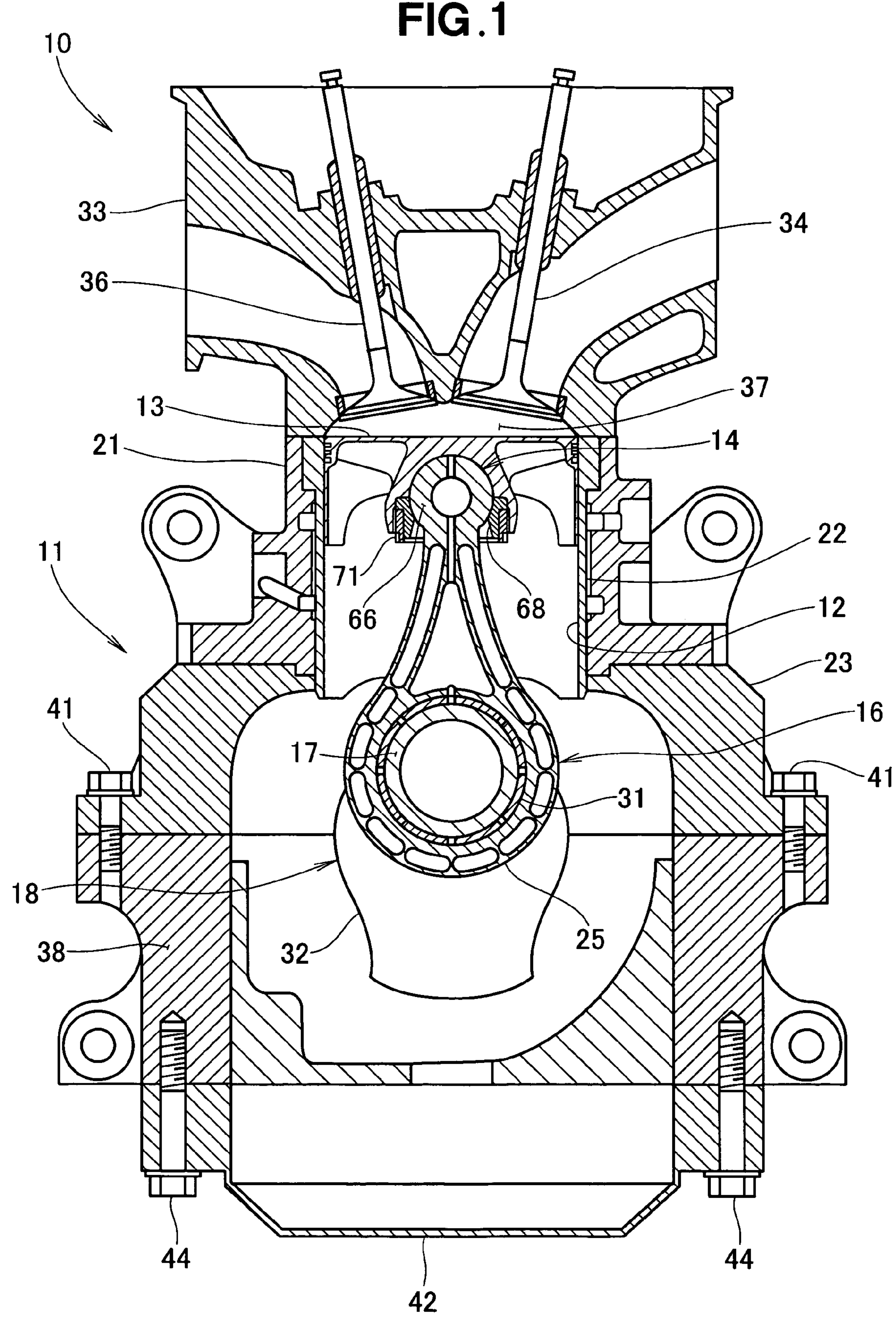
FIG. 1 is a sectional view of an internal combustion engine according to the invention.

Referring to FIG. 1, an internal combustion engine 10 has a cylinder block 11, a piston 13 fitted movably in a cylinder bore 12 provided in the cylinder block 11, a connecting rod 16 connected to the piston 13 by a spherical joint 14, and a crankshaft 18 rotatably mounted at the bottom of the cylinder block 11 and swingably supporting the connecting rod 16 with a hollow crank pin 17.

The cylinder block 11 is made up of a cylinder part 21 provided at its top, a cylindrical sleeve 22 fitted inside the cylinder part 21 and forming the cylinder bore 12, and an upper crankcase 23 attached to the bottom of the cylinder part 21.

Here, reference numeral 31 denotes an integral, seamless float bearing interposed between the a big end 25 of the connecting rod 16 and the crank pin 17; 32 a counterweight provided on the crankshaft 18; 33 a cylinder head mounted on the top of the cylinder block 11 by way of a head gasket (not shown); 34 an intake valve; 36 an exhaust valve; 37 a combustion chamber; 38 a lower crankcase attached with multiple bolts 41 to the bottom of the upper crankcase 23 to form a crankcase together with the upper crankcase 23; and 42 an oil pan fixed to the bottom of the lower crankcase 38 with bolts 44.

Figure 2:
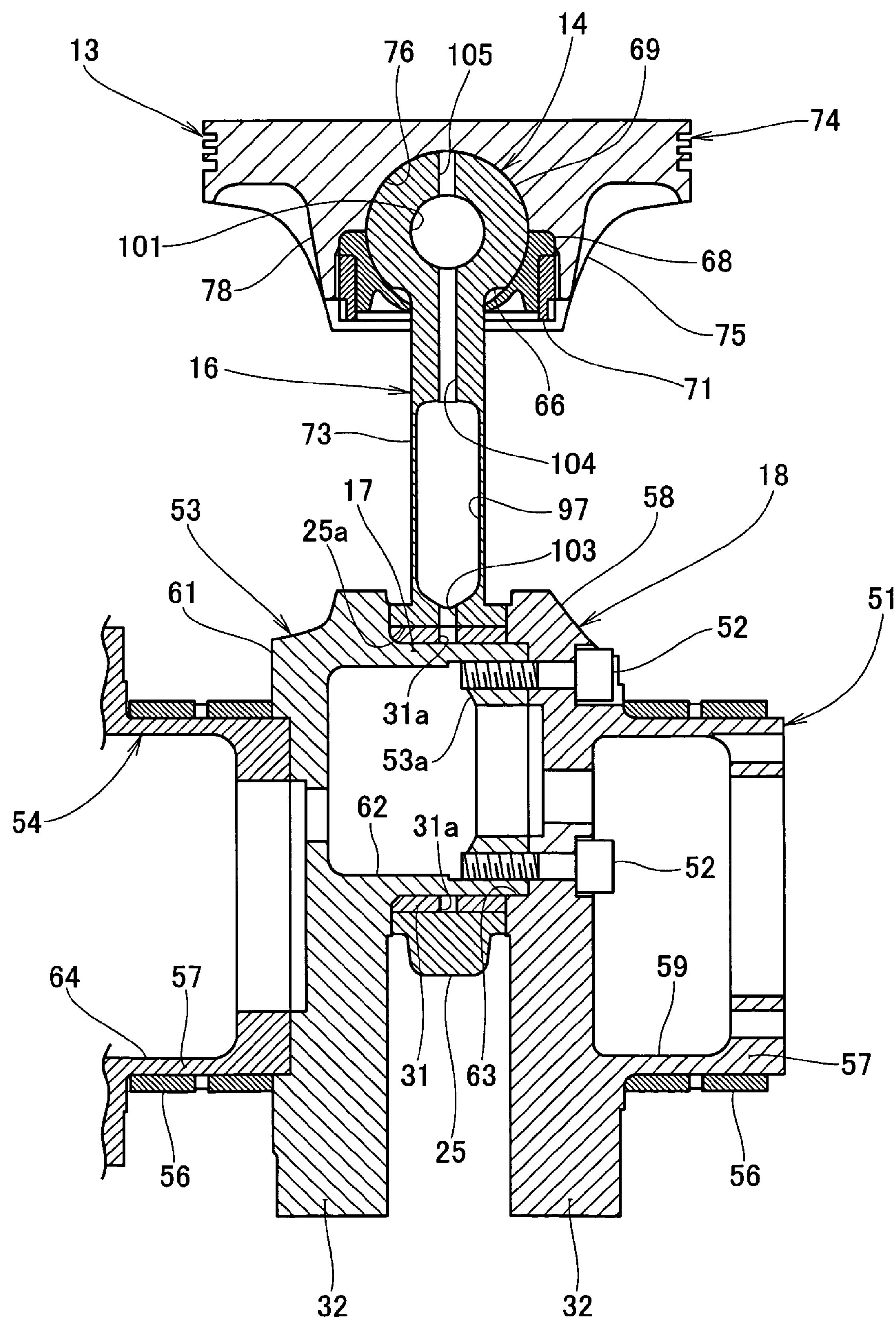
FIG. 2 is a sectional view showing the construction of the connection between a connecting rod and a crankshaft in an internal combustion engine according to the invention.

Referring to FIG. 2, the crankshaft 18 is an assembly-type crankshaft having a first shaft 51 at one end and a second shaft 53 attached by multiple bolts 52 to the first shaft 51. Reference numeral 54 denotes a third shaft attached to the second shaft 53.

The first shaft 51 is made up of a journal 57 supported by the bottom of the cylinder block 11 (see FIG. 1) and the lower crankcase 38 (see FIG. 1) by way of a float bearing 56, an arm part 58 provided at the end of this journal 57, and a counterweight 32 extending radially from this arm part 58, and a hollow part 59 is provided inside the journal 57.

The second shaft 53 is made up of an arm part 61, a hollow crank pin 17 extending sideward from the arm part 61, and a counterweight 32 extending radially from the arm part 61; a hollow part 62 is provided inside the crank pin 17, the end of the crank pin 17 is fitted in a recess 63 provided in the arm part 58 of the first shaft 51, and a flange part **53*a* projecting inward at the end of the crank pin 17 is fixed to the arm part 58 of the first shaft 51. Reference numerals 31*a*, 31*a* denote small oil holes provided in the float bearing 31, and reference numeral 64 denotes a hollow part provided in the journal 57 of the third shaft 54**.

Assembly of the connecting rod 16 to the crankshaft 18 is carried out by the following procedure.

(1) The float bearing 31 is fitted onto the crank pin 17.

(2) The big end 25 (more precisely, a big end hole **25*a* in the big end 25) of the connecting rod 16 is fitted onto the float bearing 31**.

(3) The first shaft 51 is fixed to the flange part **53*a* with the bolts 52**.

This completes the assembly of the connecting rod 16 to the crankshaft 18.

Figure 3:
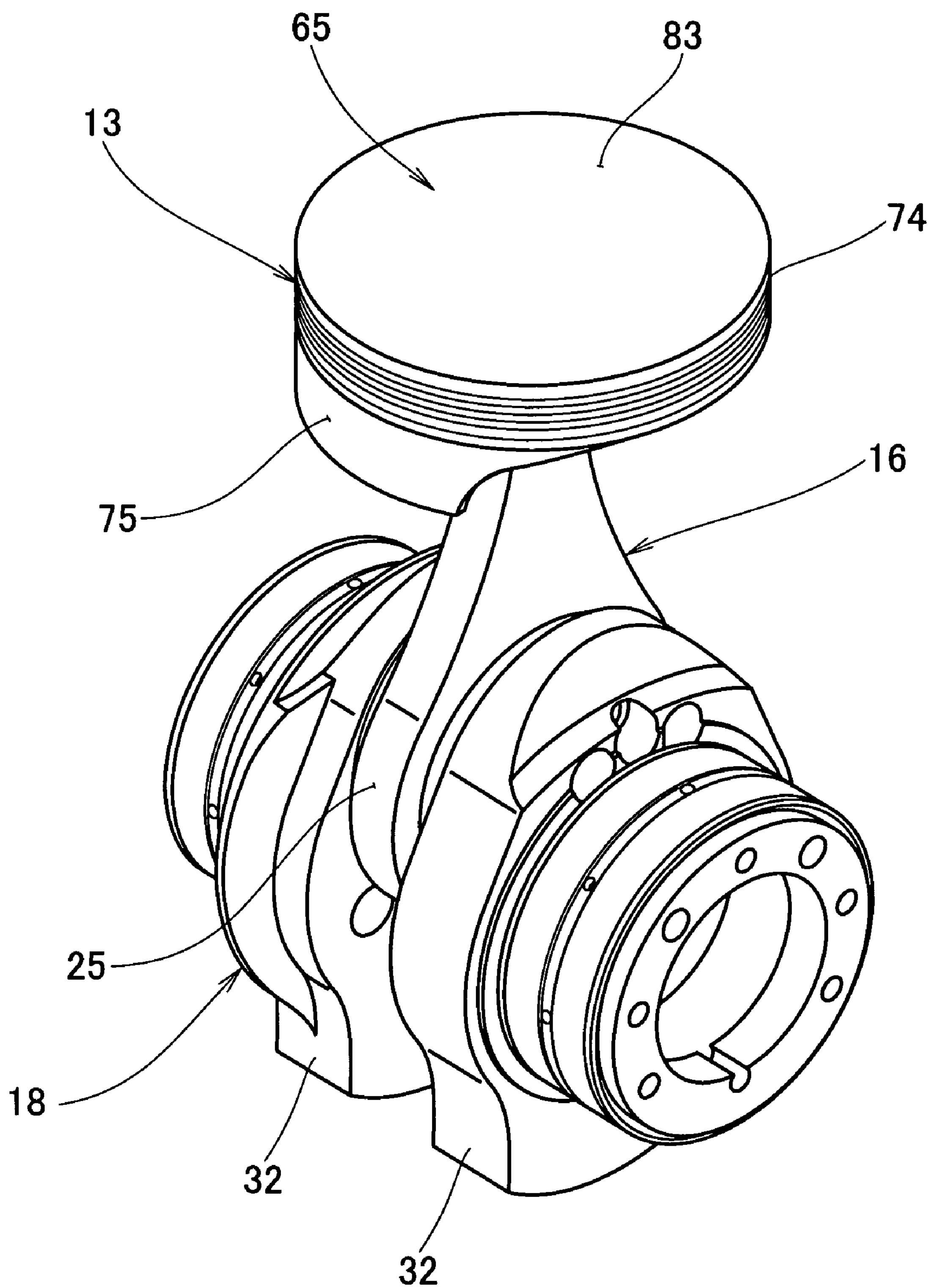
FIG. 3 is a perspective view showing the assembled state of a piston, a connecting rod and a crankshaft in an internal combustion engine according to the invention.

FIG. 3 shows the connecting rod 16 swingably attached to the piston 13 and the connecting rod 16 swingably attached to the crankshaft 18.

The piston 13 is manufactured for example by casting a raw material of material quality AC8A [JIS H 5202], carrying out T6 as a heat treatment, and then carrying out machining. For the connecting rod 16, chromium steel, chromium-molybdenum steel, and titanium alloy are suitable.

Figure 4:
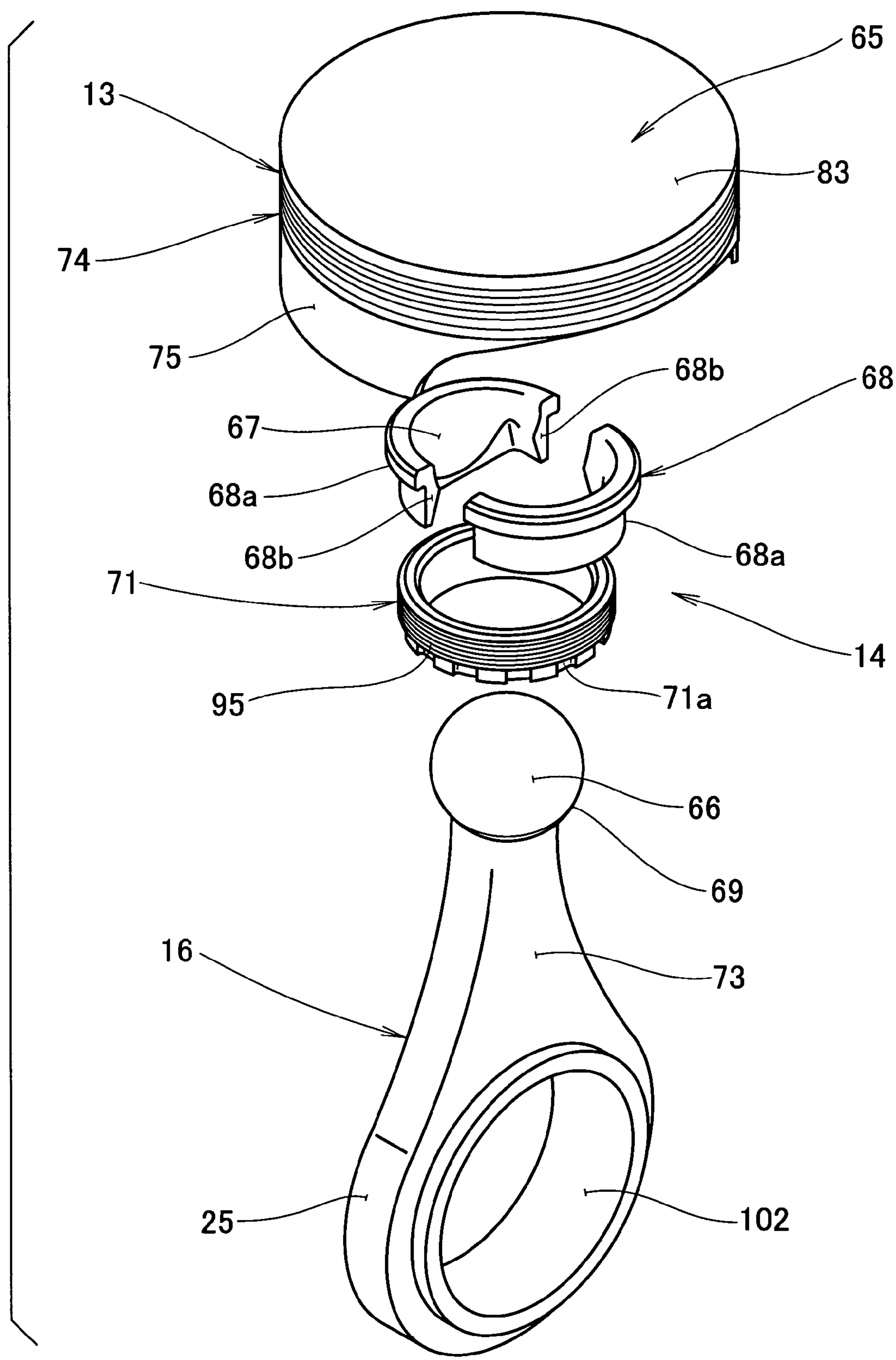
FIG. 4 is an exploded perspective view showing the construction of the connection between a connecting rod and a piston in an internal combustion engine according to the invention.

Referring to FIG. 4, a spherical small end 66 of the connecting rod 16 is abutted with the underside of a crown part 65 (discussed in detail later) of the piston 13; the bottom of this small end 66 is held by a bisected holder 68 having concave spherical faces 67, 67 (only one reference number 67 is shown); and this holder 68 is attached to the underside of the crown part 65 of the piston 13 with a nut member 71.

The connecting rod 16 is made up of the above-mentioned small end 66, the annular big end 25, and a rod part 73 integrally connecting the small end 66 and the big end 25 together. The holder 68 is made up of two holder halves 68*a*, 68*a*. Reference numerals 68*b*, 68*b* denote mating faces of the holder halves 68*a*, 68*a*. The holder 68 and the nut member 71 are members constituting part of a spherical joint 14.

Figure 5:
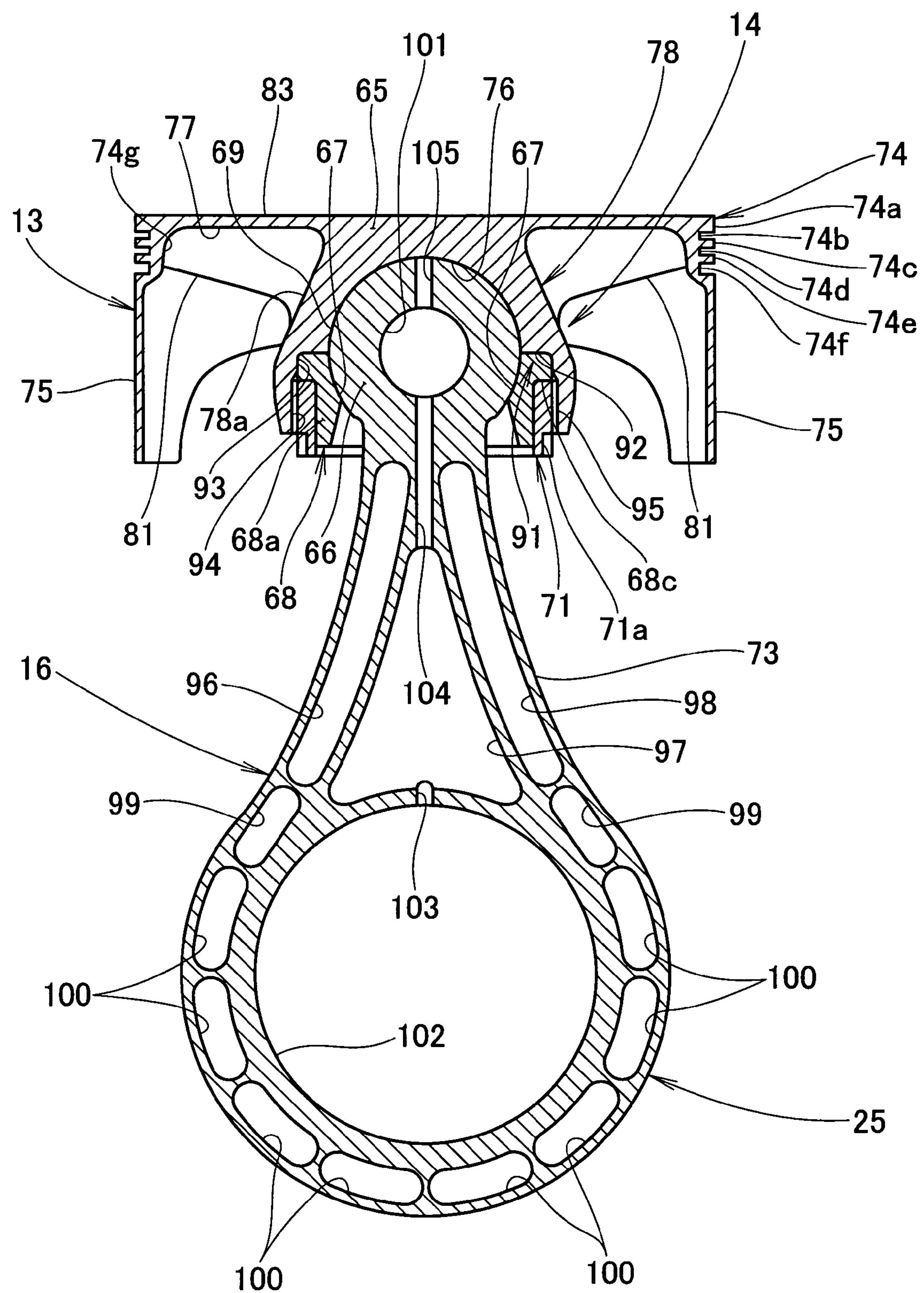
FIG. 5 is a sectional view of a connecting rod and a piston of an internal combustion engine according to the invention.

Referring to FIG. 5, the piston 13 is a member made by molding integrally the crown part 65, which is disc-shaped; a cylindrical and relatively thick land part 74 extending downward from the edge of the crown part 65; cylindrical skirt parts 75, 75, thinner than the land part 74, extending further downward from the land part 74; a cup-shaped support part 78, for forming a concave spherical surface 76 for slidably mating with the small end 66 of the connecting rod 16, formed on a rear face 77 of the crown part 65; and multiple ribs 81 running between the land part 74 and the cup-shaped support part 78 and extending downward from the rear face 77 of the crown part 65. The crown part 65 has a crown face 83 that forms a part of the combustion chamber 37 (see FIG. 1).

The land part 74 is a part provided in order from the crown face 83 side in the crown part 65 with a top land 74*a*, a top ring groove 74*b*, a second land 74*c*, a second ring groove 74*d*, a third land 74*e* and an oil ring groove 74*f*; a top ring is fitted in the top ring groove 74*b*, a second ring is fitted in the second ring groove 74*d*, and an oil ring is fitted in the oil ring groove 74*f*.

The cup-shaped support part 78 has a downward-facing recess part 91 opening downward; the above-mentioned concave spherical surface 76, which is formed in a bottom face 92 of the downward-facing recess part 91; and a female thread 94 formed in an inner circumferential face 93 of the downward-facing recess part 91. The connecting rod 16 is swingably attached to the piston 13 by the small end 66 of the connecting rod 16 being abutted with the concave spherical surface 76 and held with the spherical faces 67, 67 of the holder 68 inserted into the downward-facing recess part 91 and a male thread 95 provided on the nut member 71 then being screwed onto the female thread 94 of the cup-shaped support part 78.

The above-mentioned cup-shaped support part 78, holder 68, nut member 71 and small end 66 constitute the above-mentioned spherical joint 14.

The holder 68 is prevented from turning with respect to the cup-shaped support part 78 by a fixing pin (not shown), and has guide faces (not shown) for abutting with the rod part 73 and preventing the piston 13 from turning with respect to the connecting rod 16.

The holder halves 68*a*, 68*a* each have a step 68*c*, and the holder halves 68*a*, 68*a* are fixed by the leading end of the nut member 71 abutting with this step 68*c*. The nut member 71 has the above-mentioned male thread 95 and multiple engaging recesses 71*a* in the periphery of its rear part for a tool for turning the nut member 71 to engage with.

The connecting rod 16 is a member provided with hollow parts 96, 97, 98, 99, 100 for weight reduction inside the big end 25 and the rod part 73 and provided with a hollow part 101 for weight reduction inside the small end 66, and is provided with oil holes 103, 104, 105 for supplying oil to the sliding surfaces of the spherical joint 14 from a mounting hole 102 provided in the big end 25.

Figure 6:
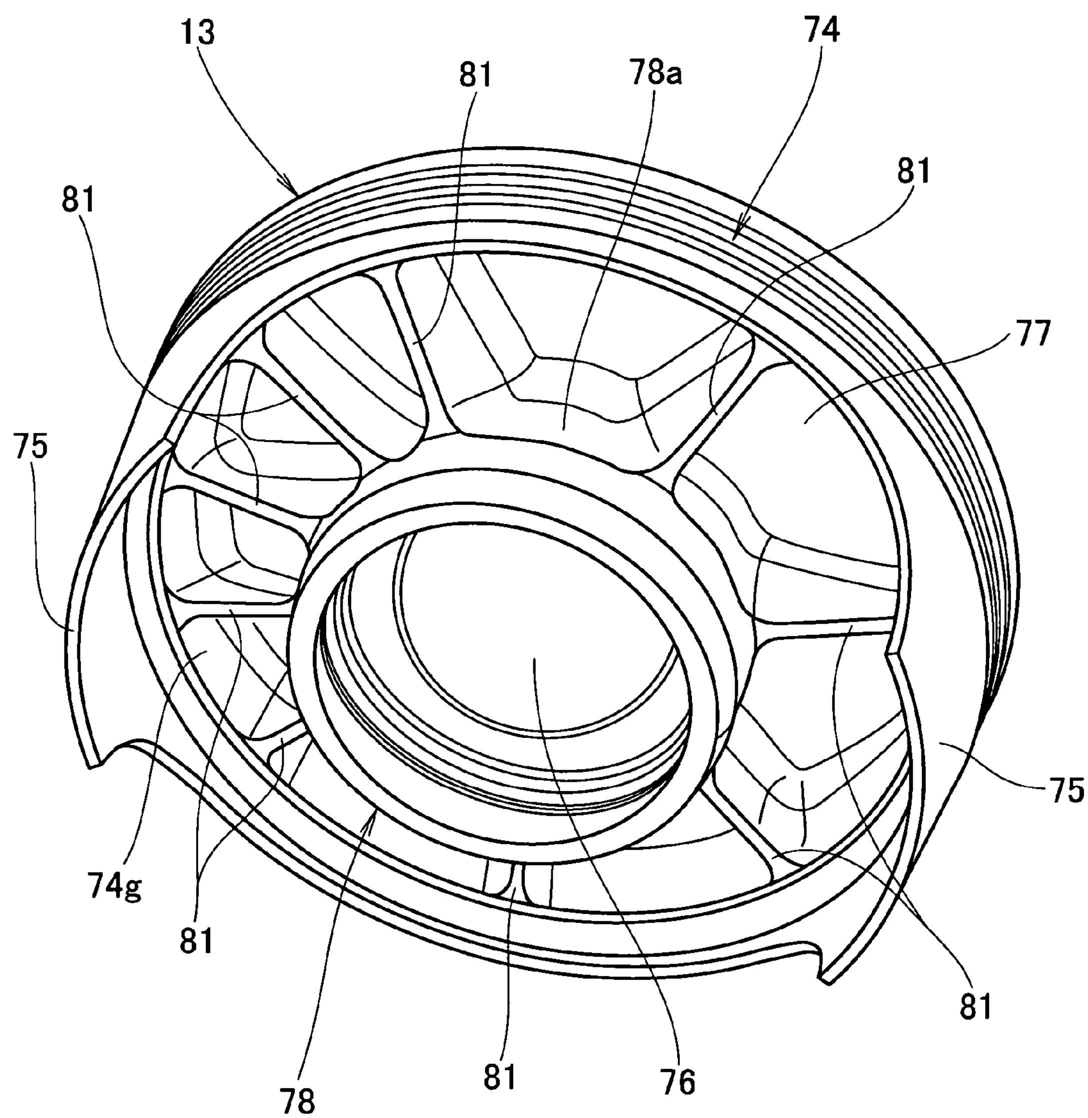
FIG. 6 is a perspective view of a piston of an internal combustion engine according to the invention.

FIG. 6 shows the multiple ribs 81 connecting together the land part 74 and the cup-shaped support part 78 formed on the rear face 77 of the crown part 65 (see FIG. 5) in the piston 13.

By multiple ribs 81 being provided like this, the land part 74 can be strongly connected to the cup-shaped support part 78, the rigidity of the top of the piston 13 can be raised, the thickness of the crown part 65 can be lowered, and the weight of the piston 13 can be reduced.

Figure 7:
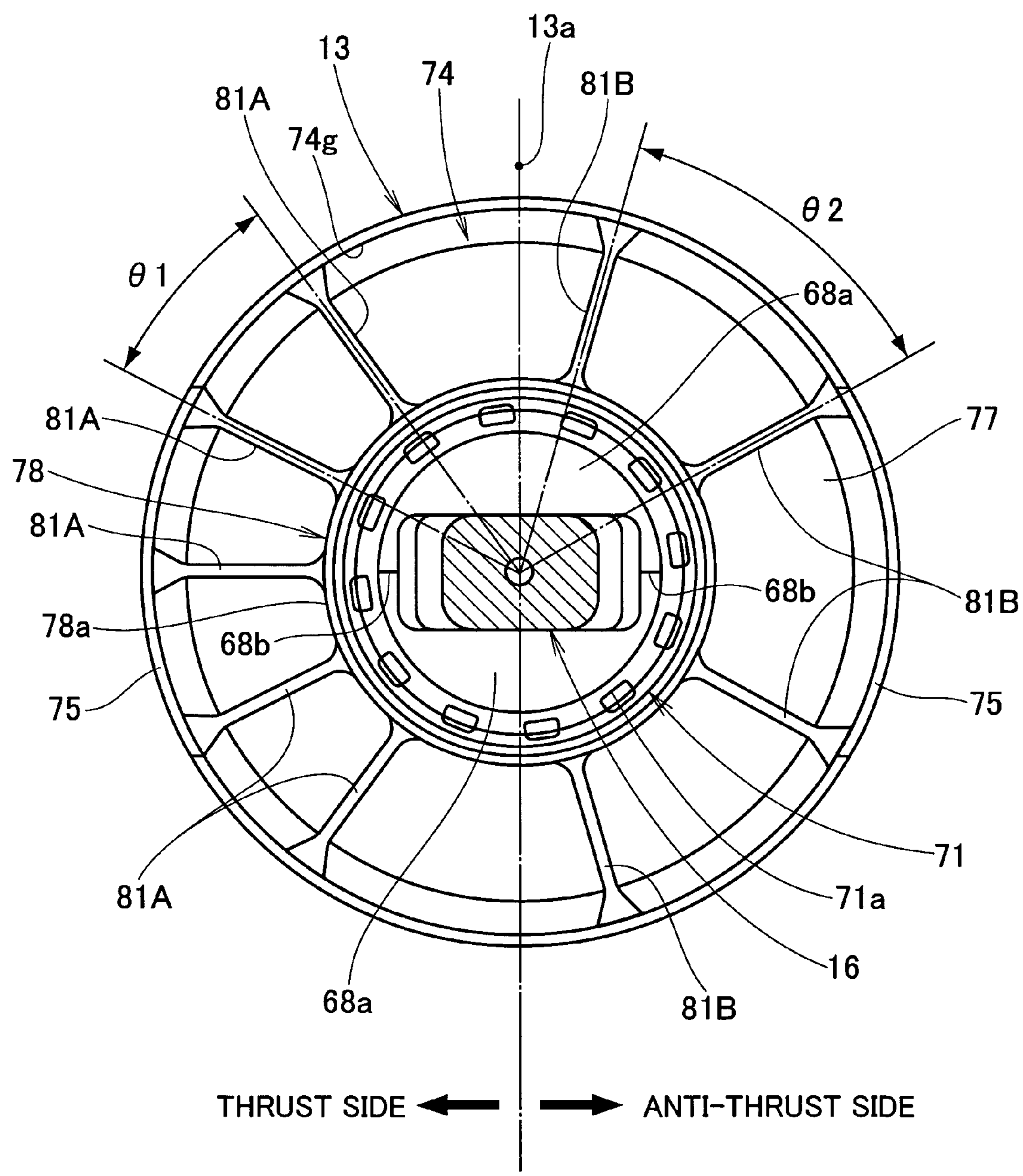
FIG. 7 is a bottom view showing the underside of a piston of an internal combustion engine according to the invention.

In FIG. 7, multiple ribs 81A, 81B (here the ribs 81 have been called the ribs 81A, 81B) have been provided radially between the inner face 74*g* of the land part 74 and the outer face 78*a* of the cup-shaped support part 78 in the piston 13; a centerline 13*a* has been drawn in the direction perpendicular to the direction in which the connecting rod 16 swings with respect to the piston 13 (the left-right direction in the figure); and a plurality of ribs 81A and a plurality of ribs 81B have been disposed asymmetrically on a thrust side of the piston 13, which lies to the left of the piston centerline 13*a*, and an anti-thrust side of the piston 13, which lies to the right of the piston centerline 13*a*. That is, the thrust-side ribs 81A are disposed relatively densely and the anti-thrust-side ribs 81B are disposed more sparsely than the ribs 81A.

For example on the thrust side each of the angle made by adjacent five ribs 81A is $\theta1$, on the anti-thrust side each of the angle made by adjacent four ribs 81B is $\theta2$, and $\theta1<\theta2$.

By the radial ribs 81 (i.e. the ribs 81A, 81B) being provided on the rear face 77 of the crown part 65 in this way, when a combustion pressure acts on the crown part 65 of the piston 13, the stress produced in the crown part 65 is distributed by the multiple ribs 81A, 81B, and stress does not concentrate at one part of the crown part 65 or one part of the cup-shaped support part 78 (for example, at the root of the cup-shaped support part 78). Therefore, the crown part 65 can be made thin without any stress becoming large, and the weight of the piston 13 can be reduced.

Because the ribs 81A, 81B are provided substantially uniformly on the rear face 77 of the crown part 65, stress arising in the crown part 65 can be distributed evenly to the ribs 81A, 81B, and the maximum value of the stress can be kept low.

Also, by the radial ribs 81A, 81B being provided more sparsely spaced on the anti-thrust side than on the thrust side, the overall weight of the sparsely spaced radial ribs 81B on the anti-thrust side can be reduced. Accordingly, further weight reduction of the piston 13 can be achieved.

Figure 8:
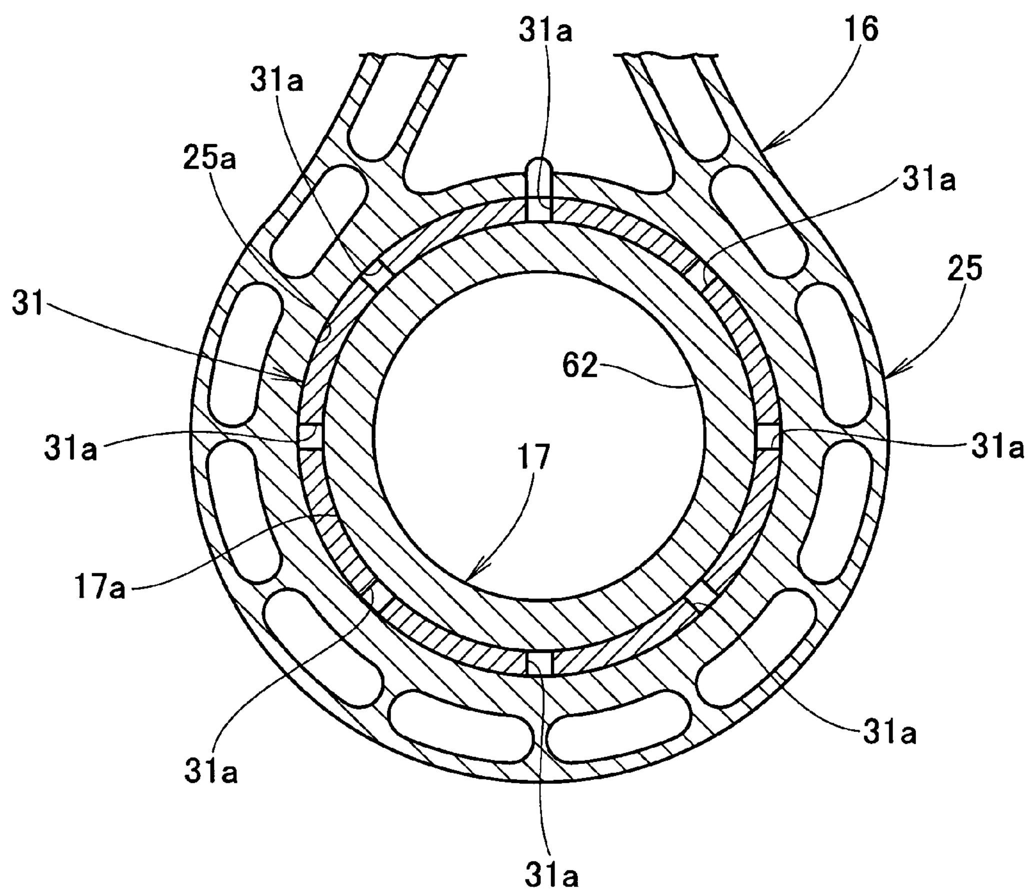
FIG. 8 is a sectional view showing the fitted state of a float bearing in an internal combustion engine according to the invention.

FIG. 8 shows the float bearing 31 interposed between the outer circumferential face 17*a* of the crank pin 17 and the big end hole 25*a* in the big end 25 of the connecting rod 16.

The float bearing 31 has the above-mentioned multiple small oil holes 31*a* provided at a uniform spacing in its circumferential direction; oil is guided from the hollow part 62 side of the crank pin 17 to these small oil holes 31*a*, and this is supplied plentifully to the sliding faces of the float bearing 31.

Figure 9:
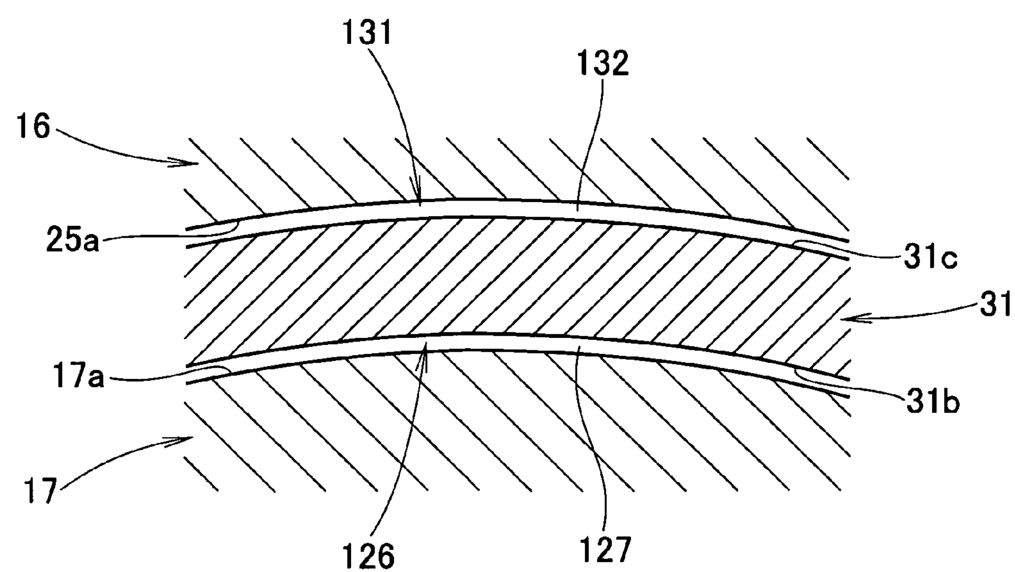
FIG. 9 is an enlarged sectional detail view showing the fitted state of a float bearing in an internal combustion engine according to the invention.

FIG. 9 shows an oil film 127 interposed in a space 126 between the outer circumferential face 17*a* of the crank pin 17 and the inner circumferential face 31*b* of the float bearing 31, an oil film 132 interposed in a space 131 between the outer circumferential face 31*c* of the float bearing 31 and the big end hole 25*a* of the connecting rod 16, and the float bearing 31 floating between the crank pin 17 and the big end 25.

As a result of this, when the crank pin 17 rotates with respect to the big end 25, the sliding speed of the float bearing 31 is about half of the sliding speed of the crank pin 17, and for example compared to a case where a sliding bearing is fixed to the big end side so that this bearing slides against the crank pin, friction can be reduced and frictional loss can be reduced.

Figure 10A:
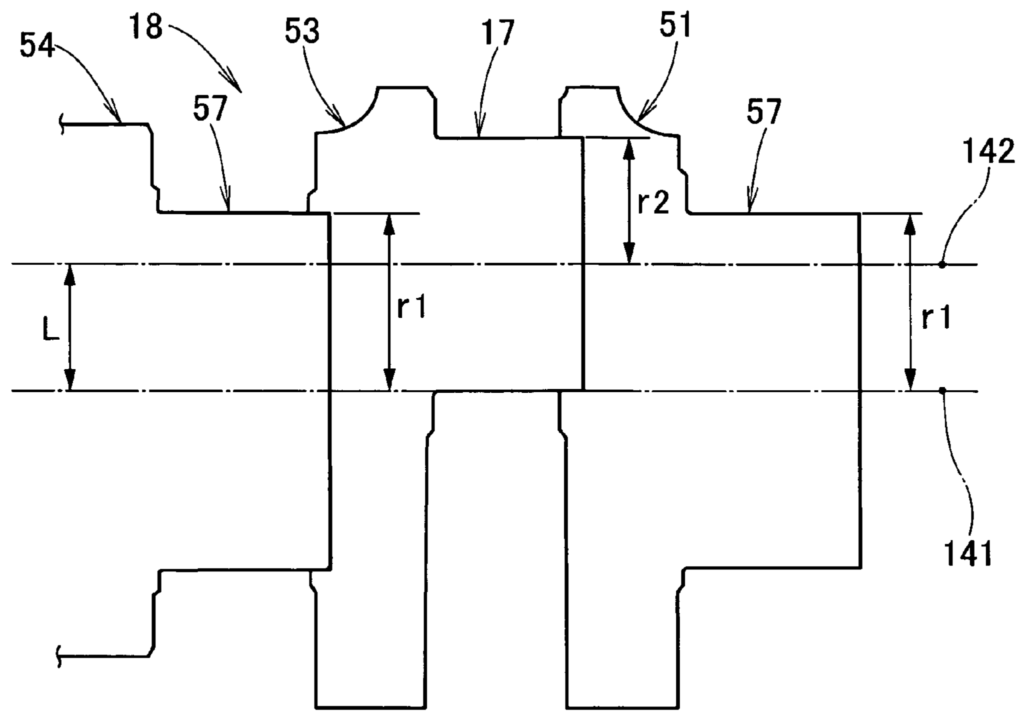
FIGS. 10A and 10B are views illustrating shapes of assembled crankshafts, FIG. 10A showing the shape of a crankshaft of a preferred embodiment of the invention and FIG. 10B showing the shape of an assembly-type crankshaft of a comparative example.

FIG. 10A shows the shape of the crankshaft 18 of an embodiment of the invention. If the axis of the crankshaft 18, i.e. the axis of the journal 57, is denoted by 141, the axis of the crank pin 17 is denoted by 142, and the distance between the axis 141 and the axis 142 is denoted L (this distance L is equal to half the stroke of the piston 13 (see FIG. 1)), then the radius r1 of the journal 57 is larger than the distance L (i.e. r1>L), and the radius r2 of the crank pin 17 is equal to the distance L (i.e. r2=L). This radius r2 may alternatively be larger than the distance L (i.e. r2>L).

Figure 10B:
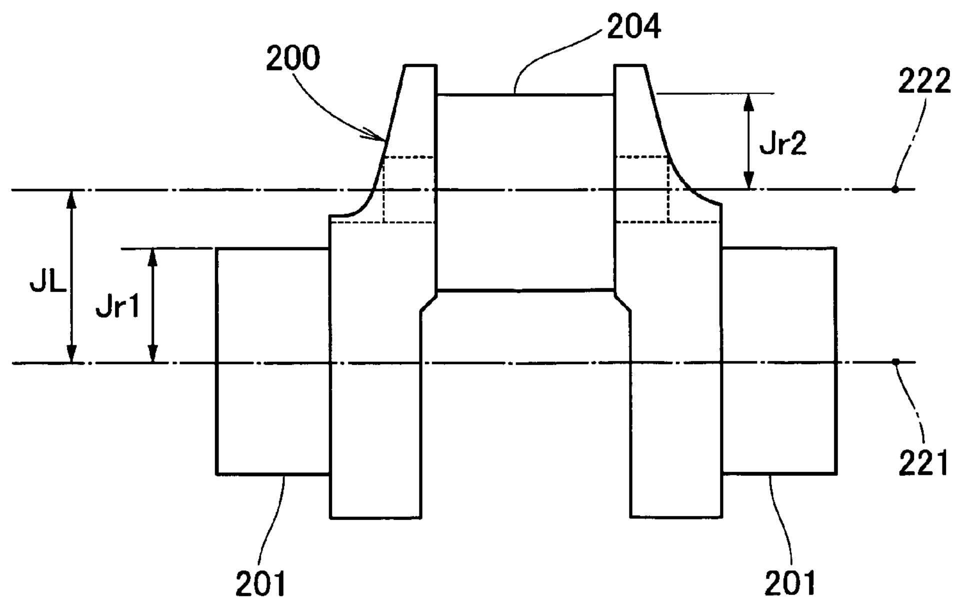

FIG. 10B shows the shape of a comparative example of an assembly-type crankshaft 200. If the axis of the crankshaft 200, i.e. the axis of the journal part 201, is denoted 221, the axis of the crank pin 204 is denoted 222, and the distance between the axis 221 and the axis 222 is denoted JL, then the radius Jr1 of the journal part 201 is smaller than the distance JL (i.e. Jrl<JL), and the radius Jr2 of the crank pin 204 is smaller than the distance JL (i.e. Jr2<JL).

From FIG. 10A and FIG. 10B, in the preferred embodiment, by at least one of the radii r1 and r2 being made larger than the distance L, the diameters of the journal 57 and the crank pin 17 can be made large, and the radial direction overlap of the journal 57 and the crank pin 17 can be made large. By this means, compared to the comparative example, it is possible to make the areas of the respective joining parts of the first shaft 51, the second shaft 53 and the third shaft 54 large, and this is convenient when joining these together with multiple bolts.

A method for manufacturing the connecting rod 16 described above will now be described.

Figure 11A:
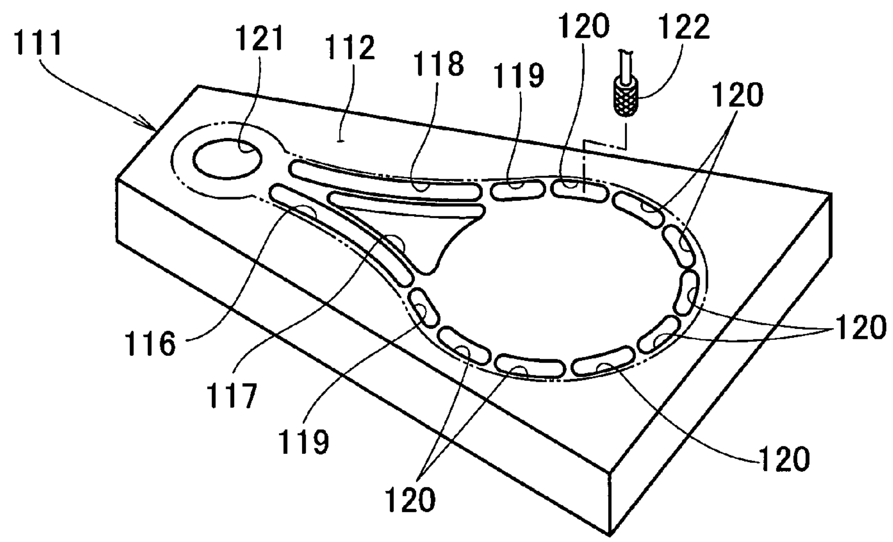
FIGS. 11A to 11C are views illustrating an example of a method of manufacturing a connecting rod according to the invention, FIG. 11A being a view illustrating concavities being formed as hollows in one side of a blank and FIG. 11B showing two blanks being joined together and FIG. 11C showing a blank being manufactured by machining.

In FIG. 11A, two blanks 111 (in the figure only one is shown) for making a connecting rod are prepared.

Then, in one side 112 of each blank, recesses 116, 117, 118, 119, 120, 121 (see FIG. 5) for forming the hollow parts 96, 97, 98, 99, 100 and 101 (see FIG. 5) are formed by cutting with an end mill 122.

Figure 11B:
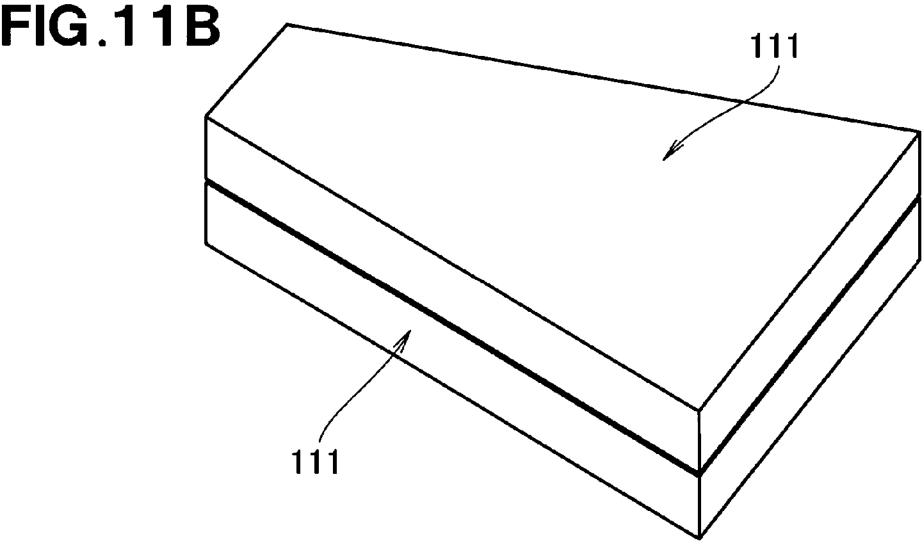

In FIG. 11B, the respective sides 112 of the two blanks 111 with the recesses 116, 117, 118, 119, 120, 121 formed in them (see FIG. 11A) are brought together and joined by, for example, brazing or diffusion joining.

Figure 11C:
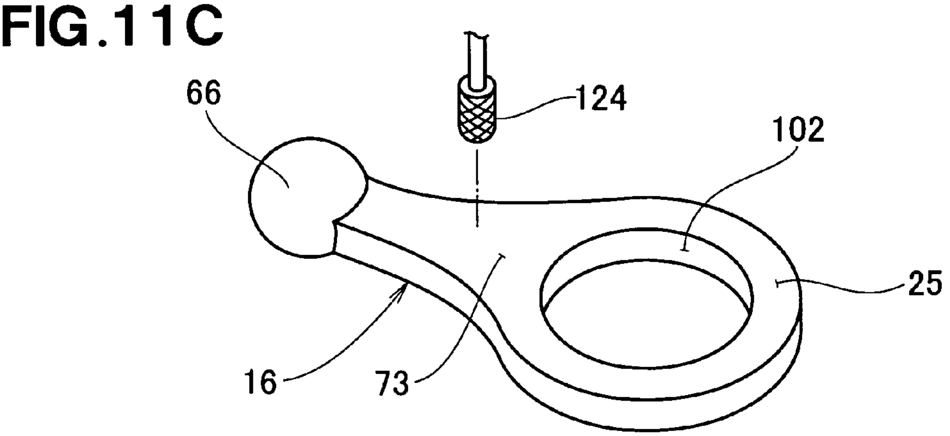
Figure 12:
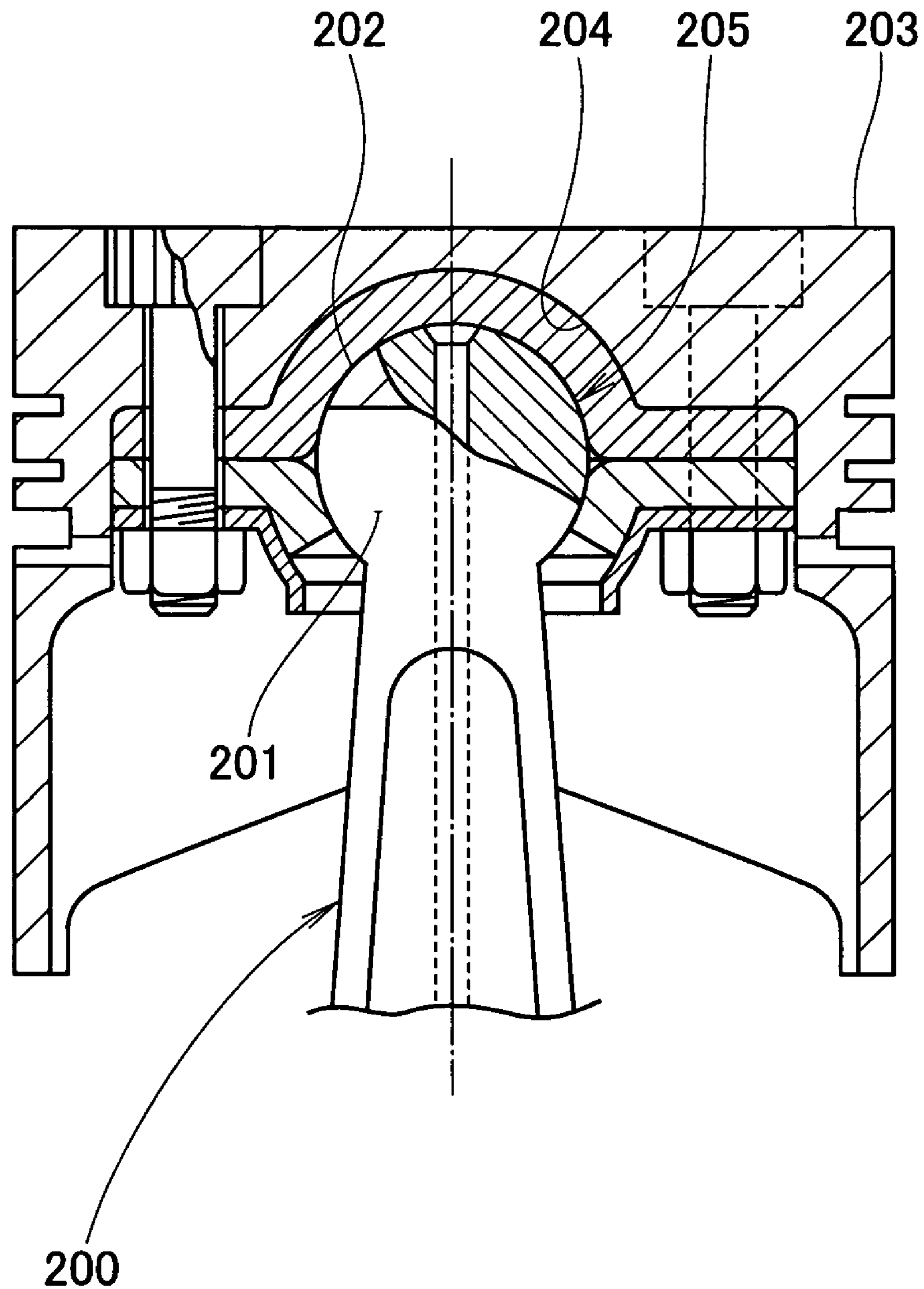
FIG. 12 is a sectional view showing a connecting rod for an internal combustion engine of related art.

In FIG. 11C, a connecting rod 16 is made by cutting the two blanks 111, 111 (see FIG. 11B) with an end mill 124 and grinding the small end.

As another method of manufacturing the connecting rod 16, for example, connecting rod halves bisected in the thickness direction of the connecting rod are each molded by casting, including the hollow parts, and these connecting rod halves are brought together and joined by brazing, as described above.

Although in this preferred embodiment hollow parts were provided inside the connecting rod, there is no limitation to this, and weight reduction can alternatively be achieved by recesses being formed in the outside of the connecting rod.

Obviously, various minor changes and modifications of the present invention are possible in the light of the above teaching. It is therefore to be understood that within the scope of the appended claims the invention may be practiced otherwise than as specifically described.

What is claimed is:

1. An internal combustion engine comprising as main moving parts a piston and a connecting rod connected to the piston, wherein:

the piston has a crown part, a cup-shaped support part provided on a rear side of the crown part and opening downward for forming a spherical joint, and multiple radial ribs extending from the cup-shaped support part to a circumferential wall formed cylindrically at an outer edge of the crown part, the connecting rod has a spherical small end part for forming the spherical joint together with the cup-shaped support part, and the connecting rod is held place by a single nut member that presses a pair of holder halves against the spherical small end part, the nut member having an inner diameter larger than a diameter of the spherical small end part, and the cup-shaped support part is a cylindrical cup having a configuration concentric with respect to the spherical joint and has a single threaded portion concentric to the spherical joint, the nut member has a threaded portion threadedly engaged with the threaded portion of the cup-shaped support part of the piston.

2. An internal combustion engine comprising as main moving parts a connecting rod, a crankshaft with a crank pin for connecting the crankshaft to an annular big end part of the connecting rod, and a float bearing interposed between the big end part of the connecting rod and the crank pin, wherein:

the connecting rod is of an integral type having the annular big end part integral therewith;

the crankshaft is of an assembly type made up of multiple component parts, the crank pin has a radius larger than or equal to a distance between an axis of the crankshaft and an axis of the crank pin, and the crank pin is hollow; and the float bearing is disposed in a floating condition with an annular space defined between an inner circumferential face of the annular big end part of the connecting rod and an outer circumferential surface of the crank pin so that an inner circumferential space for forming an inner circumferential oil film is provided between the float bearing and the crank pin, and an outer circumferential space for forming an outer circumferential oil film is provided between the float bearing and the big end part.

3. An internal combustion engine comprising as main moving parts a piston, a connecting rod connected to the piston, a crankshaft having a crank pin for connecting the crankshaft to an annular big end part of the connecting rod, and a float bearing interposed between the big end part and the crank pin, wherein:

the piston has a crown part, a cup-shaped support part provided on a rear side of the crown part and opening downward for forming a spherical joint, and multiple radial ribs extending from the cup-shaped support part to a circumferential wall formed cylindrically at an outer edge of the crown part;

the connecting rod is of an integral type integrally having the annular big end part and a spherical small end part for forming the spherical joint together with the cup-shaped support part;

the crankshaft is of an assembly type made up of multiple component parts, the crank pin has a radius greater than or equal to a distance between an axis of the crankshaft and an axis of the crank pin, and the crank pin is hollow; and the float bearing is disposed in a floating condition with an annular space defined between an inner circumferential face of the annular big end part of the connecting rod and an outer circumferential surface of the crank pin so that an inner circumferential space for forming an inner circumferential oil film is provided between the float bearing and the crank pin, and an outer circumferential space for forming an outer circumferential oil film is provided between the float bearing and the big end part.

4. The internal combustion engine according to claim 1, wherein the threaded portion of the cup-shaped support part concentric to the spherical joint comprises a female screw and the threaded portion of the single nut member comprises a male screw.

5. The internal combustion engine according to claim 1, further comprising a crankshaft having a crank pin, wherein the connecting rod has a one-piece structure including an annular big end part and a rod part formed integrally with and extending between the small end part and the big end part, the annular big end part being connected to the crank pin via an annular float bearing disposed floatingly therebetween with first and second annular spaces defined respectively between the float bearing and the crank pin and between the float bearing and the annular big end part of the connecting rod.

6. The internal combustion engine according to claim 5, wherein the annular float bearing comprises a plurality of radial oil holes formed therein and opening at opposite ends to the first and second annular spaces.

7. The internal combustion engine according to claim 5, wherein the connecting rod further comprises a hollow part formed integrally in each of the small end part, the big end part and the rod part for weight reduction inside the respective parts of the connecting rod.

8. The internal combustion engine according to claim 6, wherein the connecting rod further comprises an oil passage opening at one end to the second annular space and at another end to sliding surfaces of the spherical joint formed jointly by the cup-shaped support part of the piston and the small end part of the connecting rod.

9. The internal combustion engine according to claim 8, wherein the connecting rod further comprises a hollow part formed internally in each of the small end part, the big end part and the rod part for weight reduction inside the respective parts of the connecting rod, and the oil passage passes through the hollow parts formed in the small end part and the rod part of the connecting rod.

10. An internal combustion engine comprising as main moving parts a piston and a connecting rod connected to the piston, wherein:

the piston has a crown part, a cup-shaped support part provided on a rear side of the crown part and opening downward for forming a spherical joint, and multiple radial ribs extending from the cup-shaped support part to a circumferential wall formed cylindrically at an outer edge of the crown part, the connecting rod has a spherical small end part for forming the spherical joint together with the cup-shaped support part, and the connecting rod is held place by a single nut member that presses a pair of holder halves against the spherical small end part, the nut member having an inner diameter larger than a diameter of the spherical small end part, and the cup-shaped support part is a cylindrical cup having a configuration concentric with respect to the spherical joint and has a single threaded portion concentric to the spherical joint; the nut member has a threaded portion threadedly engaged with the threaded portion of the cup-shaped support part of the piston, wherein the threaded portion of the cup-shaped support part concentric to the spherical joint comprises a female screw and the threaded portion of the single nut member comprises a male screw, and further comprising a crankshaft having a crank pin, wherein the connecting rod has a one-piece structure including an annular big end part and a rod part formed integrally with and extending between the small end part and the big end part, the annular big end part being connected to the crank pin via an annular float bearing disposed floatingly there between with first and second annular spaces defined respectively between the float bearing and the crank pin and between the float bearing and the annular big end part of the connecting rod.

* * * * *